United States Patent Office 3,122,318
Patented Feb. 25, 1964

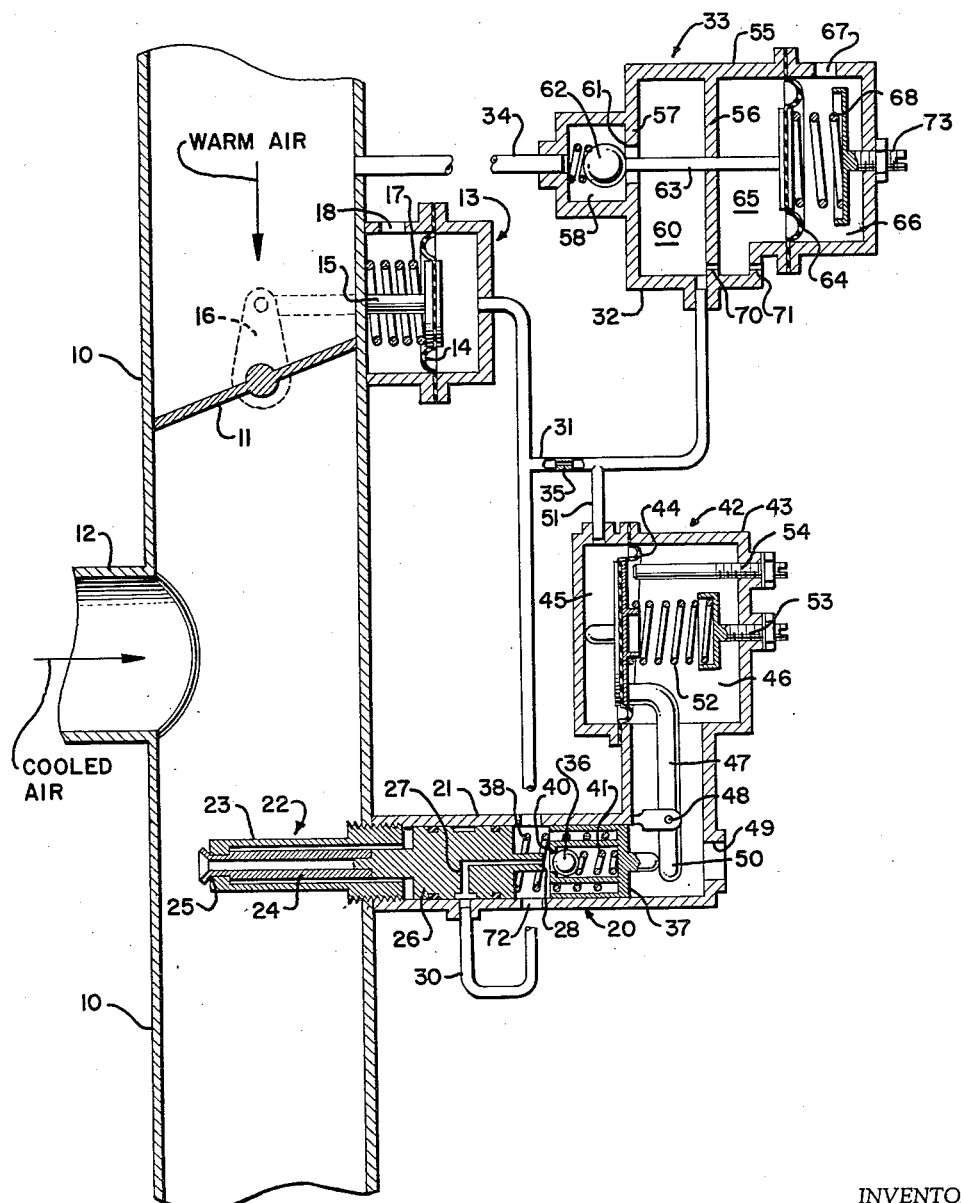

3,122,318
AMBIENT PRESSURE RESPONSIVE FLUID FLOW
CONTROLLING MECHANISM
Robert A. Null, Phoenix, Ariz., assignor to The Garrett
Corporation, Los Angeles, Calif., a corporation of
California
Filed June 11, 1959, Ser. No. 819,642
7 Claims. (Cl. 236—87)

This invention relates generally to fluid pressure apparatus and is more particularly directed to mechanism for controlling the flow of fluid in an air conditioning system. Still more particularly, the invention relates to means for controlling the flow of fluids through a duct in response to variations in temperature of the fluids in a predetermined region and also as a function of the atmospheric pressure in the vicinity of the apparatus.

It has been found that the effectiveness of air in performing heating and cooling operations varies with the changes in density of the air. It is, therefore, an object of this invention to provide means whereby the temperature of air flowing in a system is changed as a function of change in altitude.

An object of this invention also is to provide fluid flow controlling mechanism having a main valve disposed for movement in a duct, the main valve having an actuator responsive to fluid pressure controlled by a combined thermostatic and pressure responsive means.

Another object of the invention is to provide fluid flow controlling mechanism having a fluid pressure actuated main valve, and a bleed-off type of pilot control valve responsive in part to the temperature of the fluid controlled by the main valve and in part to the pressure of actuating fluid regulated in part by a reference pressure opposing atmospheric pressure.

A further object of the invention is to provide fluid flow controlling mechanism having a fluid pressure responsive main valve, and a pilot control valve operated in part by a thermostat and in part by a fluid pressure responsive actuator and pressure regulating means having an element responsive to a reference pressure derived by flowing fluid through nozzles arranged in series, the reference pressure being that existing between the nozzles and being opposed by ambient pressure and a resilient force supplied by a spring or similar element.

Another object of the invention is to provide a flow controlling mechanism having combined fluid pressure and temperature responsive means for governing the operation of a main valve, the mechanism having a regulator responsive to atmospheric pressure to vary the operating pressure supplied to the governing means as a function of the atmospheric pressure.

Other objects and advantages will be apparent from the following description of one form of the invention selected for illustration in the accompanying drawing.

In the drawing:

The figure is a schematic view of a fluid flow controlling mechanism formed in accordance with the present invention.

Referring more particularly to the drawing, numeral 10 designates generally a duct through which air is supplied to an enclosure, this duct forming part of an air conditioning system. The duct communicates with a source of warm air such as the compressor of a main aircraft engine. The duct contains a main valve 11 and downstream from such valve a branch duct 12 is connected therewith. This branch duct receives cool air from a suitable source, such as a refrigerating mechanism, and supplies it to the duct for mixing with the warm air. The valve 11 is moved between open and closed positions to temper the air flowing from the outlet end of duct 10 through the admission or restriction of warm air.

To operate the valve 11 (this valve being of the butterfly type), an actuator 13 is provided, this actuator being disposed at one side of the duct 10 and having a movable wall 14 supported therein. Movement from the wall 14 is transmitted to the valve 11 by a push rod 15 and lever 16, the latter being connected to the shaft of the valve 11.

The actuator 13 includes a coil spring 17 which is disposed between a wall of the actuator housing and the movable wall 14. This spring tends to urge the movable wall in a direction to cause the valve 11 to close. Valve opening movement is transmitted to the wall 14 by fluid pressure supplied to the actuator housing at the opposite side of the wall 14 from that occupied by the spring 17. The actuator housing at the spring-pressed side of the diaphragm communicates with the atmosphere through an opening 18. To control the operation of the actuator 13 there is provided a pilot valve mechanism 20 of the bleed-off type.

The pilot valve is thermostatically operated and includes a casing 21 secured to the duct 10 at a selected point downstream of the branch passage 12 and main valve 11. The housing has a thermostat 22 secured at one end thereof, this thermostat projecting into the duct 10. The thermostat includes concentric tubular elements 23 and 24 of materials having different coefficients of expansion. The outer element 23 has a relatively higher coefficient of expansion than the element 24, and these elements are secured to one another, as at 25, at the ends disposed within the duct 10. The inner element 24 has a body 26 secured thereto, this body closely fitting the casing 21 and being guided for movement therein. The body 26 has a passage 27 which terminates at one end within the casing 21 in a valve seat 28. The other end of the passage 27 terminates in an annular groove formed in the outer surface of the body 26. This groove communicates with a passage 30 extending to the housing of the actuator 13. Passage 30 communicates with the interior of this housing at the side of the movable wall 14 opposite that engaged by the spring 17. Passage 30 has a branch 31 communicating therewith, this branch extending to the casing 32 of a regulator 33 which adds or superimposes an atmospheric pressure control to the temperature control as will hereinafter appear.

The regulator communicates by a passage 34 with a source of fluid under pressure, such as the duct 10 at the upstream side of the valve 11. Any other suitable source of air pressure could be employed. The branch passage 31 contains a restriction 35 adjacent its point of connection with the passage 30. Fluid flow through passage 27, past the seat 28, is controlled by a ball valve 36, which is supported for movement toward and away from the seat 28 by an adaptor 37, this member being guided for movement also in the casing 21. The adaptor is urged in a direction away from the body 26 by a coil spring 38 disposed between these elements; it has a hollow central projection extending toward the body 26, this projection receiving the ball valve 36 and having inwardly projecting ears 40 to limit the outward movement of the ball valve. A coil spring 41 tends to urge the ball valve in an outward direction, this movement being limited, as indicated, by the ears 40.

To cause the engagement of the ball valve 36 with the seat 28 to control fluid flow through the passage 30, the adaptor 37 is moved toward the body 26 in opposition to the force of the spring 38. This movement is secured through the operation of an actuator designated generally by the numeral 42. Actuator 42 is a fluid pressure responsive device having a casing 43 for marginally clamping a movable wall 44. This wall and part of the casing form a pressure chamber 45 and a spring chamber 46. The wall 44 has a lever 47 secured at one end thereto, the lever being pivoted as at 48. The opposite end 50 of the lever is formed for engagement with a projection extending from the adaptor 37. The pressure chamber 45 communicates with the branch passage 31 at the upstream side of the orifice 35 through a second branch passage 51 and is thereby in fluid communication with the regulator 33 for control thereby.

When fluid is supplied to the actuator 42 through the passage 51, wall 44 will be moved in opposition to the force of a spring 52 and atmospheric pressure admitted through port 49, this movement being transmitted by lever 47 to the adaptor 37 to cause it to move toward the body 26. This action serves to move the ball valve 36 toward the seat 28. After the seat is engaged, further movement of the wall 44 in the same direction will cause the compression of spring 41. The force of spring 52, and consequently the pressure required to move valve 36 toward seat 28, may be adjusted through the operation of screw 53. The extent of movement of wall 44 in the direction to seat valve 36, is determined by an adjustable stop screw 54 carried by the casing 43.

The regulator 33 has a casing 55 with a plurality of transversely extending walls 56 and 57 which form inlet and regulated pressure chambers 58 and 60, the regulated pressure in chamber 60 constituting a gage pressure to be superimposed on the thermostat through the passage 51, chamber 45, and diaphragm 44 as will presently appear. Wall 57 between these chambers is provided with a valve seat 61 for cooperation with valve 62 to control fluid flow from the inlet chamber 58 to the regulated pressure chamber 60. Valve 62 is carried at one end of a valve stem 63 guided for movement in the wall 56. Stem 63 is secured to a movable wall 64 which is marginally clamped by parts of the casing 55. This wall 64 cooperates with the casing 55 and wall 56 to form a reference pressure chamber 65 at one side of the wall 64. A spring chamber 66 is disposed at the opposite side of this wall, the spring chamber communicating with the ambient atmosphere through an opening 67. Chamber 66 receives a coil spring 68 which tends to urge the movable wall 64 in a direction to space valve 62 from the seat 61. In the spaced condition, valve 62 permits fluid under pressure to flow from a suitable source into the regulated pressure chamber 60 from which it may flow through restriction 35 to passages 31 and 30 and thus to the actuator 13 and the pilot bleed valve 20 while simultaneously flowing directly to chamber 45 through passage 51. The wall 56 and the casing 55 of the regulator are provided with nozzles 70 and 71 through which fluid may flow from chamber 60 to chamber 65 and from the latter chamber to the ambient atmosphere. It will be noted that the nozzles 70 and 71 are arranged in series, the chamber 65 communicating with the space between the nozzles, and being maintained at substantially constant gage pressure as will now be described.

In the operation of the device, fluid under pressure admitted through passage 34 flows through inlet chamber 58 to chamber 60. Some of the fluid will flow through nozzle 70 to chamber 65 and from this chamber through nozzle 71 to the atmosphere. As previously mentioned, nozzles 70 and 71 are in series, and, in addition, they are so shaped and sized that when sufficient fluid under pressure is supplied thereto, the nozzles become choked and serve as a pressure divider. The gage pressure between the nozzles in chamber 65 stays substantially constant at a predetermined level above atmospheric and becomes a reference pressure which is applied to one side of the movable wall or diaphragm 64 in opposition to the force of the spring 68 and the ambient atmosphere, the area of said diaphragm and the force of said spring determining the level of such gage pressure. Differences between the forces at opposite sides of the movable wall 64 will move the valve 62 toward or away from the seat 61 to regulate the flow of fluid into the chamber 60 in order to maintain a sufficiently high gage pressure in chamber 60 to provide the required pressure differential to keep the reference pressure in chamber 65 constant. It will be apparent that when the atmospheric pressure applied to wall 64 decreases, the substantially constant reference pressure in chamber 65 will tend to move the wall 64 in opposition to spring 68. This movement will cause valve 62 to approach seat 61 to reduce the volume of air flowing into regulated pressure chamber 60. The thus reduced gage pressure in chamber 60 in conjunction with the series orifices 70 and 71 will maintain the necessary pressure differential so that the reference gage pressure in chamber 65 will thus tend to remain stabilized. Fluid from chamber 60 will flow through passage 51 to chamber 45 to be superimposed on the thermostat, and through restricted orifice 35, branch passage 31 and passage 30 to the actuator 13.

If the ball valve 36 of the pilot valve mechanism is engaged with the seat 28, fluid pressure will increase in the actuator 13 and wall 14 will be moved in opposition to the force of spring 17. This movement will cause valve 11 to move toward an open position. When valve 11 moves in this direction, warm air may flow through duct 10 and mix with cool air flowing through branch duct 12. This mixed air flows around the thermostat 22. If the air exceeds a predetermined temperature, the thermostat element 23 will elongate, causing element 24 to move body 26 and seat 28 away from valve 36. If valve 36 is not engaged with ears 40, it will follow the movement of seat 28 until ears 40 are engaged. At this time valve seat 28 may then move away from ball valve 36, permitting air to flow from passage 30 to the atmosphere through openings 72. When the rate escape of this air exceeds the rate at which air can flow through restriction 35, pressure in actuator 13 will fall, permitting spring 17 to move wall 14 in a direction to cause closing movement of valve 11.

It will be obvious that the pressure delivered by regulator 33 to the pressure chamber 45 of the actuator 42 will determine the position of the ball valve 36 so that as mentioned above, the thermostat will be subject to the changes in gage pressure produced in chamber 60. If spring 68 is adjusted through the manipulation of screw 73 to increase the load applied to the wall 64, pressure in chamber 60 will increase. This increased pressure will also obtain in chamber 45, imparting additional force to the wall 44 to increase the load on valve spring 41. When this adjustment is made, a higher temperature must be applied to the thermostat 22 to effect the bleeding of pressure from the passage 30.

A reverse adjustment can be secured by increasing the force on spring 52 through the adjustment of screw 53.

One of the characteristics of the nozzle is that after it becomes choked, the volume of fluid flowing through it will not be affected by changes in pressure at the outlet side. Increased pressure at the inlet side, however, will cause an increased volume to flow through the nozzle and vice versa. The nozzles are used in this instance to provide a substantially constant reference pressure in chamber 65. This pressure is applied to wall 64 in opposition to the force of spring 68 and the ambient atmosphere.

It should be obvious that as the altitude increases, the atmospheric pressure decreases, and the force applied to the spring side of wall 64 will also decrease, permitting the reference pressure in chamber 65 to move the wall. Such movement will cause ball valve 62 to move toward seat 61 and reduce the volume of air flowing into chamber 60. This reduction of air causes a lowering of pressure in chamber 60 and consequently in chamber 45, which permits wall 44 to be moved toward chamber 45 by the force of spring 52. Such movement of wall 44 is transmitted by lever 47 to adaptor 37 to relieve the force of spring 41 on ball valve 36. If adaptor 37 moves sufficiently, ball valve 36 will be moved away from seat 28 and fluid may escape from duct 30 and the pressure chamber of actuator 13. Spring 17 may then move wall 14 of actuator 13 and consequently valve 11 will move in a closing direction to reduce the flow of warm air.

When the altitude decreases, the atmospheric pressure increases, and the force applied to the spring pressed side of wall 64 also increases. This increased force moves the wall in opposition to the reference pressure in chamber 65 and in turn moves valve 62 away from seat 61 to admit more fluid to chamber 60. Obviously, the additional fluid will increase the pressure in chamber 60 and consequently in chamber 45, such increased pressure moving diaphragm 44 against the force of spring 52. Lever 47 transmits movement of diaphragm 44 to adaptor 37 to move ball 36 toward seat 28 and restrict the flow of fluid from passage 30. Such restriction to flow will cause pressure in the pressure chamber of actuator 13 to increase, which will in turn move diaphragm 14 against the force of spring 17. When this movement takes place, valve 11 will be moved toward an open position, increasing the flow of warm air.

The regulator 33 and actuator 42 cooperate with the thermostatically controlled pilot valve 20 to change, in the manner described above, the calibration of the thermostat in accordance with changes in atmospheric pressure and consequently changes in altitude. It should be clear from the foregoing that as the atmospheric pressure changes, the loading of ball valve 36 toward seat 28 is changed, and thermostat 22 will have to move a greater or lesser distance, depending upon the change in spring loading of valve 36, to effect a bleeding of fluid from passage 30 and a change of pressure on diaphragm 14 of valve actuator 13.

With this apparatus, the temperature of air can be controlled automatically so that it will be maintained at 70° F. at sea level and 20° F. at 20,000 feet. This control is designed to avoid fogging in instrument and other compartments. Representative pressures in the system may be calculated on the basis of conventional equations for suitable sizes and relative areas for nozzles 71 and 70, and the desired pressure ratios on either side of each nozzle. If it is desired to operate at sea level with chamber 60 at 30.4 in. Hg gage (60.3 in. Hg abs.) with a constant gage pressure in chamber 65 of 13 in. Hg pressure ratios across nozzle 71 (P. 65 to P. ambient) of 1.435 and across nozzle 70 (P. 60 to P. 65) of 1.406 will result with nozzle area ratios (71 to 70) of 1.3867. Then, taking the ambient pressure as the independent variable, we have (all pressures in inches of mercury):

| P. amb. | P. 65 | P. 60, P. 45 |
|---|---|---|
| 29.9 | 42.9 | 60.3 |
| 25.0 | 38.0 | 54.4 |
| 22.5 | 35.5 | 51.2 |
| 20.0 | 33.0 | 47.9 |
| 17.5 | 30.5 | 44.6 |
| 15.0 | 28.0 | 41.0 |
| 12.5 | 25.5 | 37.4 |
| 10.0 | 23.0 | 33.7 |

Thus, as the ambient pressure on the exposed faces of walls 64 and 44 drops by 19.9 inches of mercury, the absolute pressure in chamber 45 drops by 26.6 inches of mercury and is thus the controlling parameter in calibrating the operation of the thermostatic bleed valve 28—36. In the computed example, as ambient pressure drops (altitude increases) the predominant response of wall 44 to the regulated pressure in chamber 60 will open bleed valve 28, lower pressure in actuator 13, move main flow valve 11 toward closed position, and thus lower the temperature of outlet air from duct 10.

It should be obvious from the foregoing that a novel control mechanism has been provided for effecting the operation of a valve in an air conditioning system. This control mechanism includes combined temperature and pressure responsive means, together with a regulator which is effective to provide a regulated pressure which decreases as atmospheric pressure decreases and vice versa. As a result of this action, a pilot valve actuator serves to adjust a thermostat to vary the controlled temperature to compensate for changes in density and consequent air conditioning effectiveness of the atmospheric air.

I claim:

1. Fluid flow control mechanism for controlling the temperature of a conditioning fluid in a duct in response to changes in ambient pressure outside said duct, comprising: a main valve element; a fluid pressure responsive actuator operatively disposed relative to said main valve element; regulator means for communicating with a source of fluid pressure and having a valve for governing fluid flow to an outlet, said regulator means having a movable wall for actuating said valve; resilient means tending to move said valve toward an open position, said movable wall being responsive to the difference between a reference pressure derived by passing fluid from the regulated pressure side of said valve through a plurality of nozzles in series and ambient pressure; means forming a passage with a restriction, said passage establishing communication between the regulator outlet and said actuator; thermally responsive bleed valve means communicating with said actuator and passage at the downstream side of said restriction; and fluid pressure responsive means communicating with said passage at the upstream side of said restriction, said last-named fluid pressure responsive means being operatively related to said bleed valve to vary the operating range thereof, the construction and arrangement of the parts being such that the scheduled temperature control of the thermally responsive bleed valve means will be changed in response to changes in ambient pressure.

2. Fluid flow control mechanism for controlling the temperature of a conditioning fluid in a duct in response to changes in ambient pressure outside said duct, comprising: a main valve element; a fluid pressure responsive actuator operatively disposed relative to said main valve element; regulator means for communicating with a source of fluid pressure and having a valve for governing fluid flow to an outlet, said regulator means having a movable wall for actuating said valve; resilient means tending to move said valve toward an open position; means for varying the effective force of said resilient means, said movable wall being responsive to the difference between a reference pressure derived by passing fluid from the regulated pressure side of said valve through a plurality of nozzles in series and ambient pressure; means forming a passage with a restriction, said passage establishing communication between the regulator outlet and said actuator; thermally responsive bleed valve means communicating with said actuator and passage at the downstream side of said restriction; and fluid pressure responsive means communicating with said passage at the upstream side of said restriction, said last-named fluid pressure responsive means being operatively related to said bleed valve to vary the operating range thereof, the construction and arrangement of the parts being such that the scheduled temperature control of the thermally responsive bleed valve means will be changed in response to changes in ambient pressure.

3. Fluid flow control mechanism for controlling the temperature of a conditioning fluid in a duct in response to changes in ambient pressure outside said duct, comprising: a main valve element; a fluid pressure responsive actuator operatively disposed relative to said main valve element; regulator means for communicating with a source of fluid pressure and having a valve for governing fluid flow to an outlet, said regulator means having a movable wall for actuating said valve; resilient means tending to move said valve toward an open position, said movable wall being moved in opposition to said resilient means by the difference between a reference pressure derived by passing fluid from the regulated pressure side of said valve through a plurality of nozzles in series and ambient pressure; means forming a passage with a restriction, said passage establishing communication between the regulator outlet and said actuator; bleed valve means communicating with said actuator and passage at the downstream side of said restriction; thermostatic means for operating said bleed valve means; fluid pressure responsive means communicating with said passage, said fluid pressure responsive means being operative to vary the effective operating range of said thermostatic means whereby the scheduled temperature control of the bleed valve means will be changed in response to changes in ambient pressure; and means for adjusting said last-mentioned fluid pressure responsive means.

4. Fluid flow control mechanism for controlling the temperature of a conditioning fluid in a duct in response to changes in ambient pressure outside said duct, comprising: a main valve element; a fluid pressure responsive actuator operatively disposed relative to said main valve element; regulator means for communicating with a source of fluid pressure and having a valve for governing fluid flow to an outlet, said regulator means having a movable wall for actuating said valve; resilient means tending to move said valve toward an open position, said movable wall being moved in opposition to said resilient means by the difference between a reference pressure derived by passing fluid from the regulated pressure side of said valve through a plurality of nozzles in series and ambient pressure; means forming a passage with a restriction, said passage establishing communication between the regulator outlet and said actuator; bleed valve means communicating with said actuator and passage at the downstream side of said restriction; thermostatic means for operating said bleed valve means; a second movable wall operatively disposed relative to said bleed valve means to urge the same toward closed position in response to fluid under pressure from said regulator whereby the scheduled temperature control of the bleed valve means will be changed in response to changes in ambient pressure; and means for varying the responsiveness of said movable wall to fluid pressure.

5. Fluid flow control mechanism for controlling the temperature of a conditioning fluid in a duct in response to changes in ambient pressure outside said duct, comprising: a main valve element; a fluid pressure responsive actuator operatively disposed relative to said main valve element; regulator means for communicating with a source of fluid pressure and having a valve for governing fluid flow to an outlet, said regulator means having a movable wall for actuating said valve; resilient means tending to move said valve toward an open position, said movable wall being moved in opposition to said resilient means by the difference between a reference pressure derived by passing fluid from the regulated pressure side of said valve through a plurality of nozzles in series and ambient pressure; means forming a passage with a restriction, said passage establishing communication between the regulator outlet and said actuator; bleed valve means communicating with said actuator and passage at the downstream side of said restriction, said bleed valve means having first and second relatively movable elements; thermostatic means operatively connected with the first element of said bleed valve; means resiliently urging the second element of said bleed valve toward the first element thereof; and means responsive to regulated pressure from said regulator for varying the force of said resilient urging means, the construction and arrangement of the parts being such that the scheduled temperature control of the thermally responsive bleed valve means will be changed in response to changes in ambient pressure.

6. Apparatus for controlling the temperature of a conditioning fluid in a duct according to a predetermined temperature schedule and in response to ambient pressure, said duct having a valve element therein, such apparatus comprising: a fluid pressure responsive actuator adapted to be operatively connected to said valve; passage means leading from a source of fluid pressure to said actuator, said passage means having a flow restriction therein; bleed valve means communicating with said passage means at the downstream side of said flow restriction, said bleed valve serving to vary the fluid pressure applied to said actuator to effect its operation; means responsive to temperature change in a portion of the duct to actuate said bleed valve; and means responsive to changes in ambient pressure to vary the operating range of said bleed valve.

7. Fluid flow control mechanism for controlling the temperature of a conditioning fluid in a duct in response to changes in atmospheric pressure comprising: a main valve element adapted to be disposed in a duct; a fluid pressure responsive actuator operatively disposed relative to said main valve element; regulator means for communicating with a source of fluid pressure and having an inlet valve for governing fluid flow to a regulated pressure region leading to the regulator outlet, said regulator means also having a reference pressure chamber and an atmospheric pressure chamber; a movable wall between the two last-recited chambers, said wall being connected with and actuating said inlet valve in response to changes in pressures in said atmospheric and reference pressure chambers to produce a regulated pressure which is a function of atmospheric pressure; means for establishing a substantially constant gage pressure in said reference pressure chamber, said means having a pair of nozzles in series, the first nozzle receiving fluid from said regulated pressure region and the other nozzle discharging to the atmosphere, the pressure between said nozzles being applied to said reference pressure chamber; means forming a passage with a restriction, said passage establishing communication between the regulator outlet and said actuator; a thermally responsive bleed valve means communicating with said actuator and said passage at the downstream side of said restriction; and fluid pressure operated means communicating with said passage at the upstream side of said restriction, said fluid pressure operated means being responsive to variations in the regulated pressure to adjust said bleed valve to vary the thermal operating range thereof.

References Cited in the file of this patent

UNITED STATES PATENTS

| 2,570,624 | Wyckoff | Oct. 9, 1951 |
|---|---|---|
| 2,761,464 | Faust | Sept. 4, 1956 |
| 2,775,231 | Silver | Dec. 25, 1956 |
| 2,780,413 | Jensen | Feb. 5, 1957 |
| 2,835,449 | Joesting | May 20, 1958 |
| 2,884,905 | Jensen | May 5, 1959 |
| 2,909,323 | Cholvin et al. | Oct. 20, 1959 |

FOREIGN PATENTS

| 775,375 | Great Britain | May 22, 1957 |
|---|---|---|
| 1,096,839 | France | Feb. 9, 1955 |